Nov. 29, 1938.  K. T. LANG  2,138,179
ROTARY PRINTING MACHINE
Filed May 20, 1936

Inventor:
Karl Theodor Lang

Patented Nov. 29, 1938

2,138,179

UNITED STATES PATENT OFFICE 2,138,179

ROTARY PRINTING MACHINE

Karl Theodor Lang, Coswig-Dresden, Germany, assignor to Dresden-Leipziger Schnellpressen-Fabrik A. G., Coswig, Germany Application May 20, 1936, Serial No. 80,773
In Germany May 22, 1935

4 Claims. (Cl. 101—153)

This invention relates to a cylinder arrangement, and particularly to intaglio cylinders and their arrangement in rotary printing machines.

Intaglio cylinders must be arranged in the machine frame so as to be easily exchangeable. It has been proposed to extend the bearings of an intaglio cylinder into the side walls of the machine frame to such an extent that the ends of the shaft terminate within the frame walls. To exchange an intaglio cylinder under this arrangement the frame walls must be recessed, which weakens them considerably, and even so is the exchange operation quite bothersome.

The invention eliminates these drawbacks by making the cylinder shaft shorter than the clear width between the walls of the frame and by further providing journal bearings or pedestals on the ends of the cylinder shaft, which are exchanged with the cylinder and, when the cylinder is in operative position, rest on holders disposed in the frame walls of the machine and projecting somewhat into the free space between the walls.

The bearing holders are preferably adjustable. Drive of the cylinder is effected by providing one of the bearing holders with the necessary driving means and providing further means for coupling the drive with the shaft of the exchangeable cylinder. Particularly suitable is an easily detachable coupling which may be arranged in the free space between the frame walls.

Figure 1:
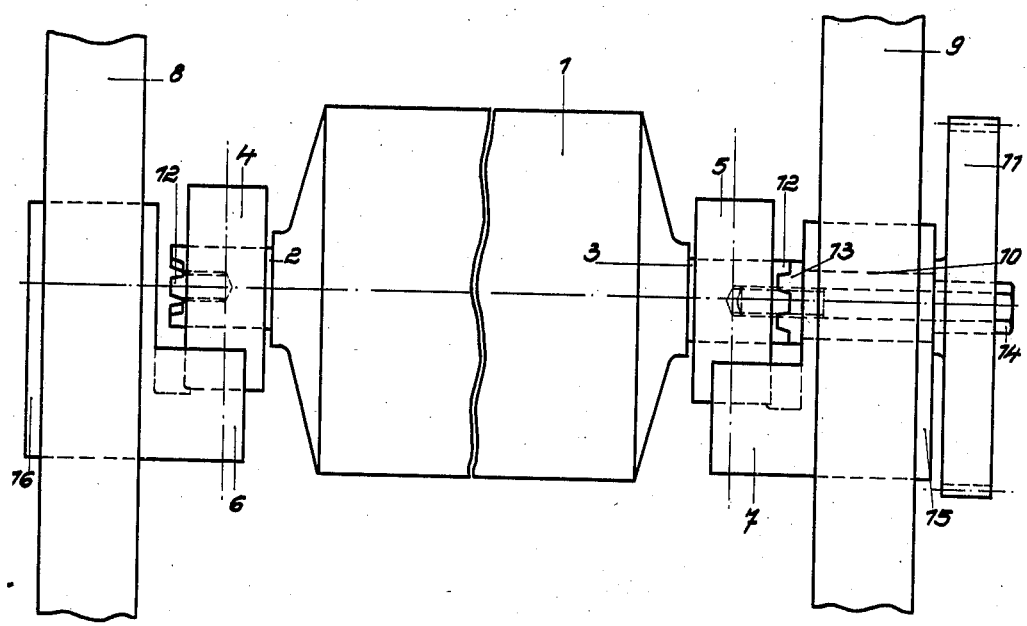
Figure 2:
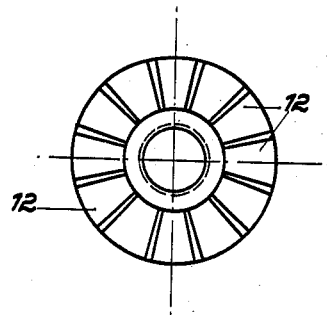

By way of example, the invention is illustrated in the accompanying drawing, in which Figure 1 is a diagrammatic side view of the portion of the machine, in which the intaglio cylinder is disposed; Fig. 2, a view on an enlarged scale of the axle journal fitted with the coupling means; and Fig. 3, a section of Fig. 2.

Referring to the drawing, the intaglio cylinder 1 is carried by a shaft whose ends 2 and 3 are fitted with the bearings 4 and 5. In the lateral frame walls 8 and 9 the bearing holders 15 and 16 are stationarily or displaceably arranged and extend with their parts 7 and 6 into the free space between the frame walls to provide supports for the bearing members 4, 5.

Figure 3:
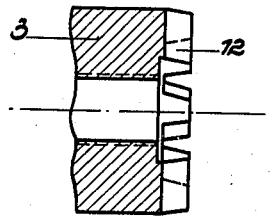

The bearing holder 16 contains a rotatable hollow shaft 10 which on the outside of the machine carries a toothed driving wheel 11 and which on the inside is fitted with a coupling member 13. The coupling member 13 is toothed and engages the teeth of a companion coupling 12 disposed on the front side of the shaft end 3. An adjusting screw 14 passing through the hollow shaft 10 insures the connection of the two coupling members. The shaft end 2 is preferably also provided with a coupling member 12 to permit insertion of the intaglio cylinder 1 in the machine also in opposite position. Figs. 2 and 3 show the special construction of the coupling members on an enlarged scale and in section. The teeth of the coupling are always disposed on the sides of the shaft end or on the hollow shaft 10. The set screw 14 is provided in a threaded bore arranged for this purpose in the center of the shaft end.

As clearly seen in Fig. 1, neither the shaft ends 2, 3 nor the bearing members 4, 5 arranged thereon extend into the frame walls 8, 9. The cylinder 1 is removed by first loosening the coupling screw 14. The cylinder 1 is then laterally displaced on the bearing holders 6, 7 in such manner that the coupling members 12, 13 are brought out of engagement, whereupon the cylinder can be lifted out of the holders 6, 7 in vertical upward direction and rolled out of the machine on a path, not shown. It is also possible downwardly to displace the bearing holders 6, 7 or 15, 16 in the frame walls 8, 9 until the cylinder 1 is placed on a suitable guide and the holding means 6, 7 release the bearings 4, 5. The cylinder can then be rolled out on the guide path. A new cylinder is inserted by reversing the process described. It is important that during exchange the bearings 4, 5 remain on the shaft ends and are exchanged also, in contradistinction to known devices wherein the bearings during the exchange are partly taken off and then installed again.

I claim:—

1. A rotary printing machine, comprising a machine frame consisting of two walls, a rotary impression cylinder, a shaft for the cylinder, said shaft being shorter than the clear width between said walls, supporting bearings permanently attached to the ends of the shaft, holders for receiving said supporting bearings, said holders being disposed in said walls and extending into the free space between them, driving mechanism on one of said holders and means arranged inside the free space between the frame walls for coupling the driving mechanism with said cylinder shaft.

2. A rotary printing machine, comprising a machine frame consisting of two walls, a rotary impression cylinder, a shaft for the cylinder, said shaft being shorter than the clear width between said walls, supporting bearings permanently attached to the ends of the shaft, holders for receiving said supporting bearings, said holders being disposed in said walls and extending into the free space between them, driving mechanism on one of said holders and detachable coupling means arranged inside the free space between the frame walls for coupling the driving mechanism with said cylinder shaft.

3. A rotary printing machine, comprising a rotary impression cylinder, a shaft for said cylinder, self-contained bearings arranged on the ends of said shaft, frame walls the clear width between which is greater than the cylinder axis, and vertically adjustable bearing holders in each frame wall for supporting said self-contained bearings for the impression cylinder.

4. A rotary printing machine according to claim 3, wherein guides for the bearing holders are provided.

KARL THEODOR LANG.